Jan. 6, 1970   D. E. DYKAAR ET AL   3,488,048
DOCUMENT FEEDER

Original Filed June 1, 1965

INVENTORS
DAVID E. DYKAAR &
BERNARD J STEIN

BY
their ATTORNEYS

Jan. 6, 1970  D. E. DYKAAR ET AL  3,488,048
DOCUMENT FEEDER

Original Filed June 1, 1965

INVENTORS
DAVID E. DYKAAR &
BERNARD J. STEIN

BY
Brumbaugh, Free, Graves & Donohue
their ATTORNEYS

INVENTORS
DAVID E. DYKAAR &
BERNARD J. STEIN
BY
their ATTORNEYS

FIG. 8

INVENTORS
DAVID E. DYKAAR &
BERNARD J. STEIN
BY
their ATTORNEYS

United States Patent Office 3,488,048
Patented Jan. 6, 1970

3,488,048
DOCUMENT FEEDER
David E. Dykaar, Great Neck, and Bernard J. Stein, Jamaica Estates, N.Y., assignors to Lundy Electronics & Systems, Inc., Glen Head, N.Y., a corporation of New York
Original application June 1, 1965, Ser. No. 460,136, now Patent No. 3,363,756, dated Jan. 16, 1968. Divided and this application Jan. 15, 1968, Ser. No. 697,755
Int. Cl. B65h 3/06, 7/10, 5/02
U.S. Cl. 271—10    8 Claims

ABSTRACT OF THE DISCLOSURE

A system for feeding a single document from a plurality of documents in a stack including a device for extracting at least one document from the stack, first and second rollers having document-engaging surfaces in cooperative relation to each other, the extractor feeding at least one document between the rollers, the first roller being driven in a direction to drive a document between the rollers and the second roller being driven in a direction to prevent a document from passing between the rollers.

---

This is a division of application Ser. No. 460,136, filed June 1, 1965, now Patent No. 3,363,756.

This invention relates to a document feeding system and, more particularly, to apparatus for feeding a single document from a plurality of documents arranged in a stack.

Such a feeding system has wide application in systems in which documents are handled, such as document sorting, character reading and other data processing equipment. The above-mentioned application Ser. No. 460,136, now Patent No. 3,363,756, relates to a document handling system in which documents are sorted in accordance with detectable characters thereon.

One conventional type of document feeder employs several different vacuum systems in conjunction with a plurality of perforated feed and reverse belts. Such a system is relatively complex and unreliable. Furthermore, the openings in one feed belt must be in alignment with the openings in the other feed belt or a document will be withdrawn from the stack of documents in a skewed position which would probably cause the jamming of the machine and possibly the destruction of the documents. In time, it is likely that the two feed belts will get out of alignment due to aging, slipping, etc.

These and other disadvantages of the prior art are obviated in the present invention by extracting at least one document from the stack of documents and feeding it between first and second rollers having document-engaging surfaces, rotating the first roller in a direction for driving a document between the first and second rollers, and rotating the second roller in a direction tending to prevent a document from passing between the first and second rollers.

For a more complete understanding of the invention reference may be had to the following detailed description of exemplary embodiments taken in conjunction with the accompanying figures of the drawings, in which.

Figure 1:
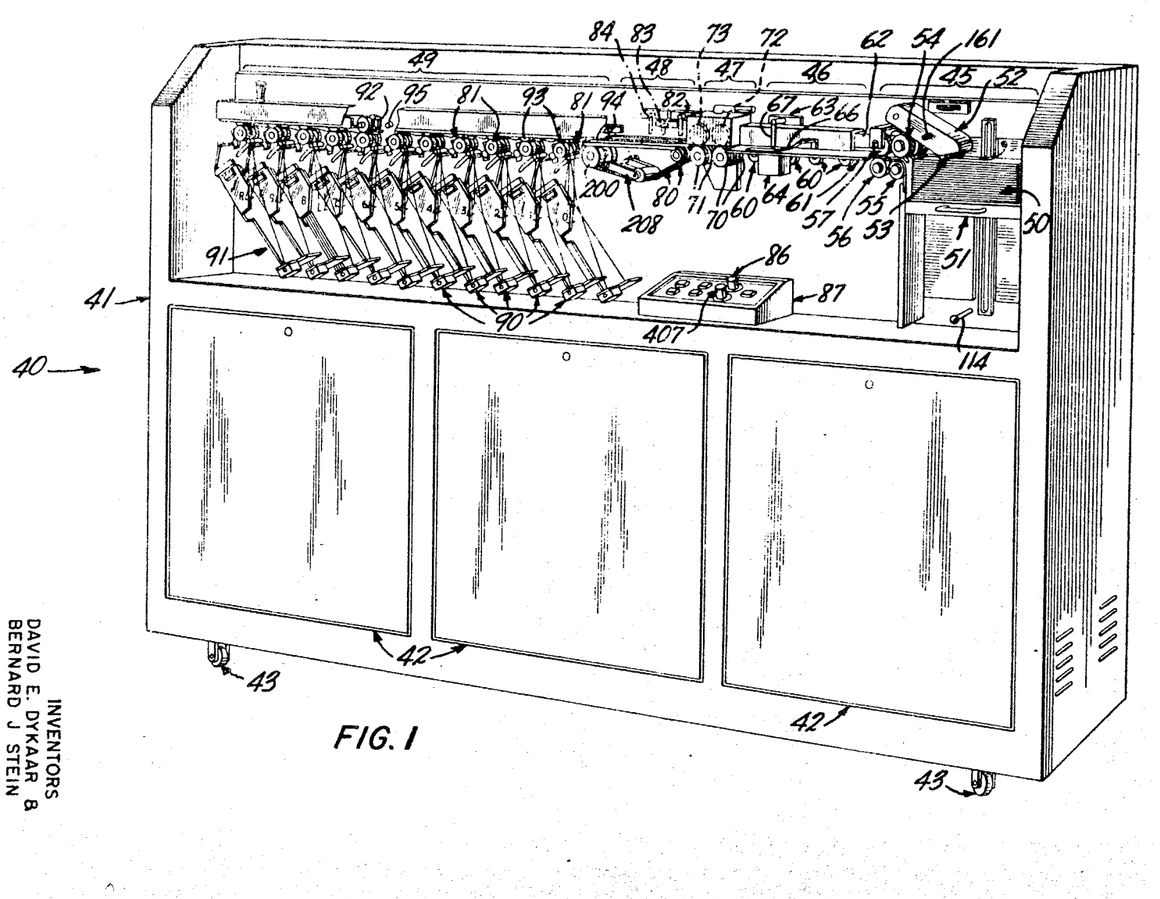
FIGURE 1 is a perspective view, portions being removed, of document sorting apparatus including an exemplary embodiment of document feeding apparatus according to the present invention.

A brief description of the invention and its method of operation may be had in conjunction with the document sorting apparatus of FIGURE 1. The sorting apparatus 40 is mounted in an enclosure 41 which conceals much of the electrical and mechanical drive components behind a plurality of removable panels 42. The enclosure 41 is supported by a plurality of casters 43 so that the sorting apparatus may be readily moved to any desired location.

Figure 4:
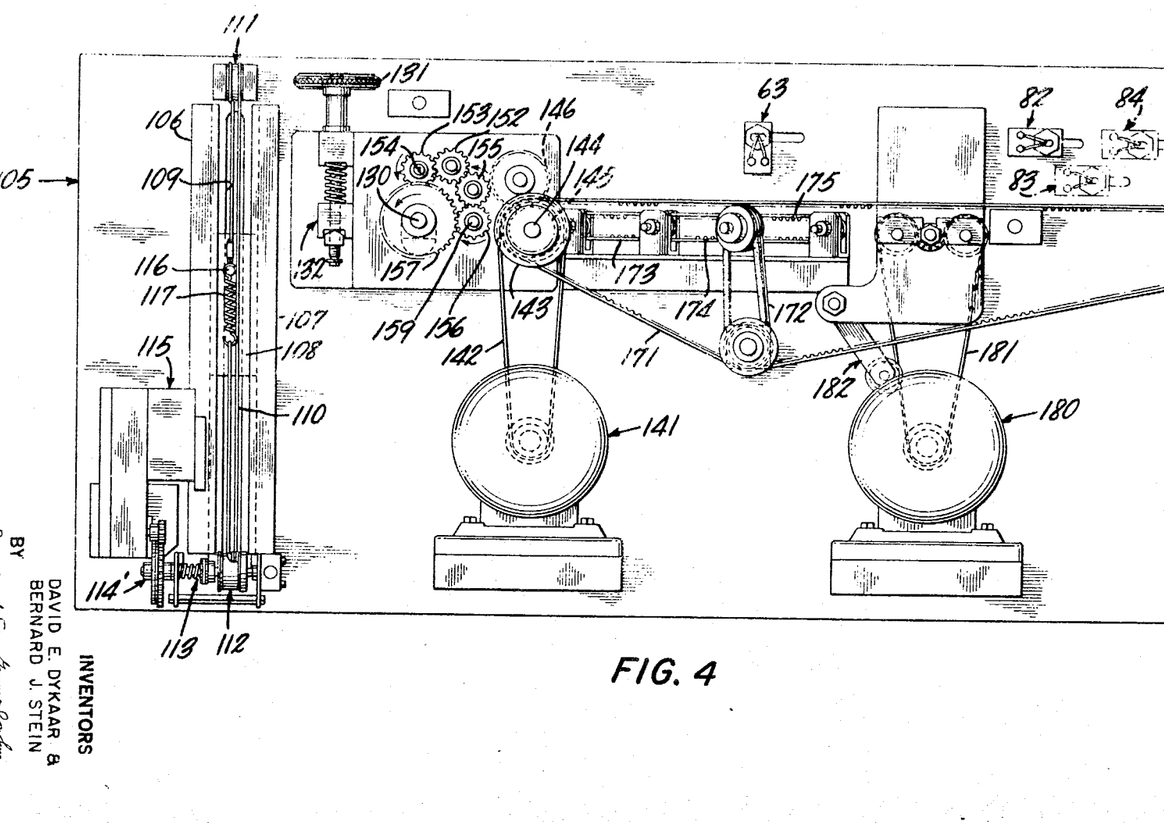
FIGURE 4 is a view in rear elevation of the apparatus of FIGURE 2.

The document handling portion of the apparatus may be conveniently divided into a feeder section 45, a registration section 46, a reading section 47, a tape transport section 48, and a pocket section 49. A stack of documents 50 to be sorted is placed upon an elevating table 51 which is driven by a motor 115 (FIGS. 4 and 5) into engagement with an extractor 52. The extractor includes a plurality of rollers 53, the document engaging surfaces of which may be driven at a speed of about 60 inches per second, for example, so as to feed at least one document from the stack 50 to a bite formed between the document engaging surfaces of a plurality of separator rollers 54 which cooperates with a plurality of retard rollers 55 to pass single documents consecutively therebetween, the rollers 54 and 55 being driven clockwise as viewed in FIGURE 1 so that the separator rollers 54 drive a document therebetween while the retard rollers tend to prevent the passage of a document. According to one embodiment of the invention, the document engaging surfaces of the separator rollers 54 are driven at about 60 inches per second while those of the retard rollers 55 are driven at about 30 inches per second.

Disposed downstream of the retard rollers 55 are a plurality of pullout rollers 56, the document engaging surfaces of which are driven about 60 inches per second in a direction to convey the document to the registration section 46. A plurality of idler rollers 57 is spring mounted against the pullout rollers 56 to ensure that a document is firmly grasped, and the pullout rollers 56 are spaced from the extractor rollers 53 a distance less than the length of the shortest document to be sorted so that the pullout rollers 56 grip a given document before that document is released by the extractor rollers 53. This insures that each document is positively driven through the bite formed by the separator rollers 54 and the retard rollers 55, and it prevents a document from being turned or displaced laterally in the registration section 46 until the document has passed the pullout rollers 56, thereby preventing the trailing edge of each document from displacing any of the documents in the stack 50.

The registration section 46 includes four rollers 60 disposed below a platform 61 along which the documents move through the registration section, the platform being provided with apertures through which the rollers 60 extend so as to engage the documents. Disposed above each of the registration rollers 60 is an idler roller (FIG. 3) which is spring-biased against its corresponding registration roller. A registration plate 62 is disposed perpendicular to the platform 61 and parallel to the direction of travel of the documents from the feeder section 45 to the reading section 47, and the registration rollers are mounted on shafts which are inclined at an angle of about 10°, for example, from a line perpendicular to the registration plate 62, so as to drive one edge of a document against the registration plate while the document is being conveyed to the reading section 47. In this way, each document is so aligned that the characters thereon, which are to be read, will pass in cooperative relation to a reading head (FIG. 3) in the reading section 47.

Figure 2:
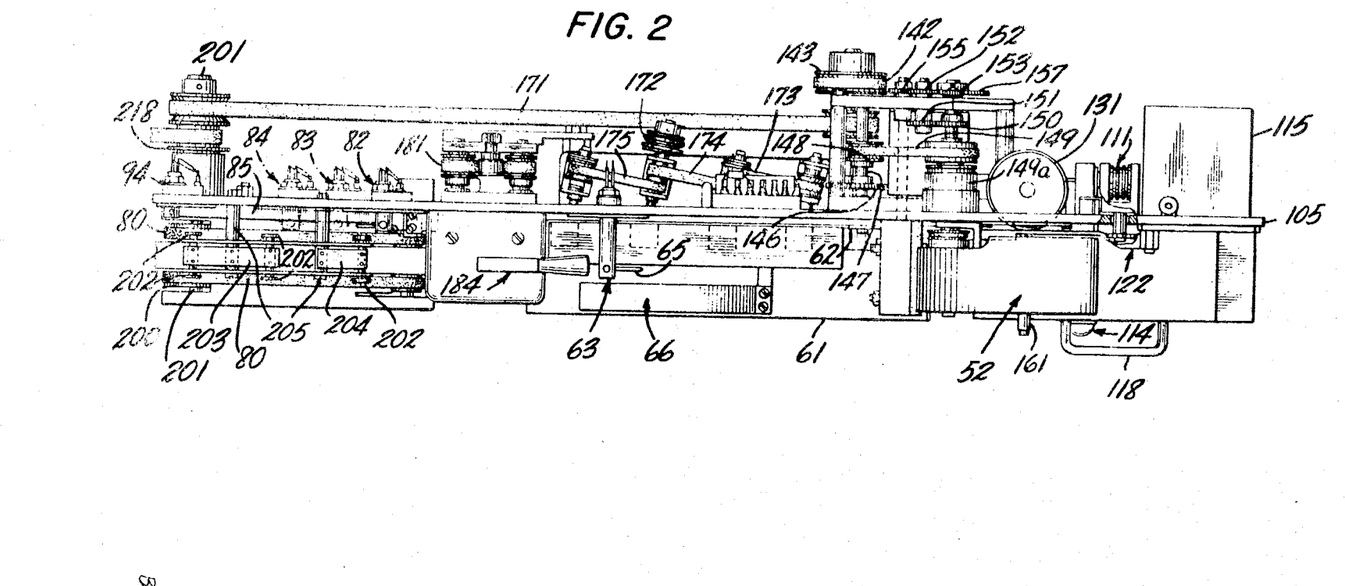
FIGURE 2 is an enlarged plan view of a portion of the apparatus of FIGURE 1.

A photoelectric sensor 63, which may, for example, include a photodiode or other suitable photoconductive device, the resistance of which is proportional to the light energy incident thereon, is mounted on the main frame 105 on one side of the platform 61 and cooperates with a suitable source of light 63a (FIG. 7) in a housing 64 on the opposite side of the platform to detect the presence of a document therebetween. A slot 65 is provided in the platform 61 to permit the transmission of light therethrough (see FIG. 2). Slots are provided in the main frame 105 (FIGS. 3 and 7), so that the sensor 63 and the lamp 63a may be adjusted along the document transport path as desired. A deflector spring 66 prevents the leading edge of each document from accidentally striking the light sensor housing 67. For clarity, the deflector spring 66, and the registration elements are omitted from FIG. 7.

The documents are conveyed through the registration section 46 at a speed of approximately 150 inches per second, thereby causing a gap between successive documents which is a function of the document length, inasmuch as the documents are fed through the feeder secton 45 at about 60 inches per second. For example, the gap between 6 inch documents would be about 9 inches.

The documents are then conveyed through the reading section 47 by pairs of rollers 70 and 71, which are driven by a synchronous motor 180 and against which pairs of idler rollers 72 and 73 are respectively spring-biased (shown in phantom in FIG. 1). The reading section 47 is discussed in detail in the above-mentioned application Ser. No. 460,136, but further discussion thereof is not necessary in the present application.

The documents are conveyed through the tape transport section 48 by a pair of tapes 80 against which are spring-biased a plurality of idler rollers. The tape transport section 48 serves as a speed transition means between the reading section 47, where the documents are conveyed at a speed of 150 inches per second, and the pocket section 49, where the documents are conveyed at a speed of 100 inches per second. When the lead edge of document is gripped by the first pair of drive rollers 81 in the pocket section 49, the tapes 80 slip or slide along the document and mutilation is prevented.

A photoelectric sensor 82 is disposed in the tape transport section 48 at a predetermined distance from the reading head such that the leading edge of a document is directly beneath this sensor when a specific field or group of characters on the document is approaching the reading head. Similarly, photoelectric sensors 83 and 84 (shown in phantom in FIG. 3) may be employed to locate other fields on each document. A deflector spring 85 (FIGS. 2 and 3) insures that the leading edge of a document will not accidentally strike one of the shrouds extending from the sensors 82, 83, and 84. A switch 86 on a control panel 87 may be used to select the desired field from which one of the characters is to be read. The photoelectric sensor 82 also cooperates with the sensor 63 to determiner whether the spacing between successive documents is less than a predetermined minimum value, as will be explained hereinafter. Furthermore, all of the photoelectric sensors in the sorting apparatus are employed to determine whether each document exceeds a minimum predetermined speed.

The pocket section 49 includes ten significant character pockets 90, designated "0," "1," "2," ... "9" as well as a reject pocket 91, designated R and adapted to receive documents not guided into any of the significant character pockets 90. Further discussion of the pocket section 49, discussed in detail in the above-mentioned application Ser. No. 460,136, is not necessary in the present application.

FEEDER SECTION

Referring now to FIGS. 2-6, the feeder section 45 includes a document-receiving enclosure 100 formed by a side wall 101, two rear walls 102 and 103, and an internal lateral wall 104 of the main enclosure 41. A supporting frame 105 is provided with a pair of gibs 106 and 107 which guide a slide 108 on which the elevator table 51 is mounted, a portion of the slide extending through a vertical slot 109 in the main supporting frame 105. A drive cable 110 is mounted around an upper pulley 111 and a lower drum 112, the drum being driven through a conventional spring-mounted clutch 113 and a gear train 114' by a suitable drive motor 115. The drive cable 110 is secured to the slide 108 by a pin 116 and is maintained under tension by an extension spring 117. The clutch 113 may be disengaged by a clutch lever 114 through suitable means well known to the art, after which the elevating table 51 is disengaged from the drive motor 115 and may be easily moved to any desired position by means of a handle 118.

To load a stack of documents into the document-receiving enclosure 100, the clutch 113 is disengaged by means of the clutch lever 114, and the elevating table 51 is lowered a sufficient extent so that the stack may be easily loaded thereon. The elevating table 51 is raised until the uppermost document is just beneath the extractor rollers 53, and then the clutch lever 114 is actuated to couple the elevating table 51 with the drive motor 115. If a power switch in the control panel 87 is turned on, the drive motor 115 will drive the elevating table 51 (and with it the stack 50) until a switch 120 in the energizing circuit for the drive motor 115 is opened by the uppermost document in the stack, the switch being actuated by a document engaging foot 121. A deflector spring 122 mounted on the rear wall 103 insures that the outermost document is guided beneath the foot 121 as it is removed from the stack by the extractor 52. As documents are withdrawn from the stack, the document engaging foot 121 moves downwardly to a predetermined point at which the switch 120 is closed completing the energizing circuit for the drive motor 115. The upper surface 123 of the elevating table 51 is sloped downwardly toward the side wall 101 so that the stack 50 rests thereagainst. The upper portion of the side wall 101 forms a metering plate 125 which prevents all but the uppermost documents in the stack from being extracted by the extractor 52. Thus the elevating table 51 is automatically driven in an intermittent fashion by means of the switch 120 to maintain a minimum number of documents above the metering plate 125.

Figures 5, 7:
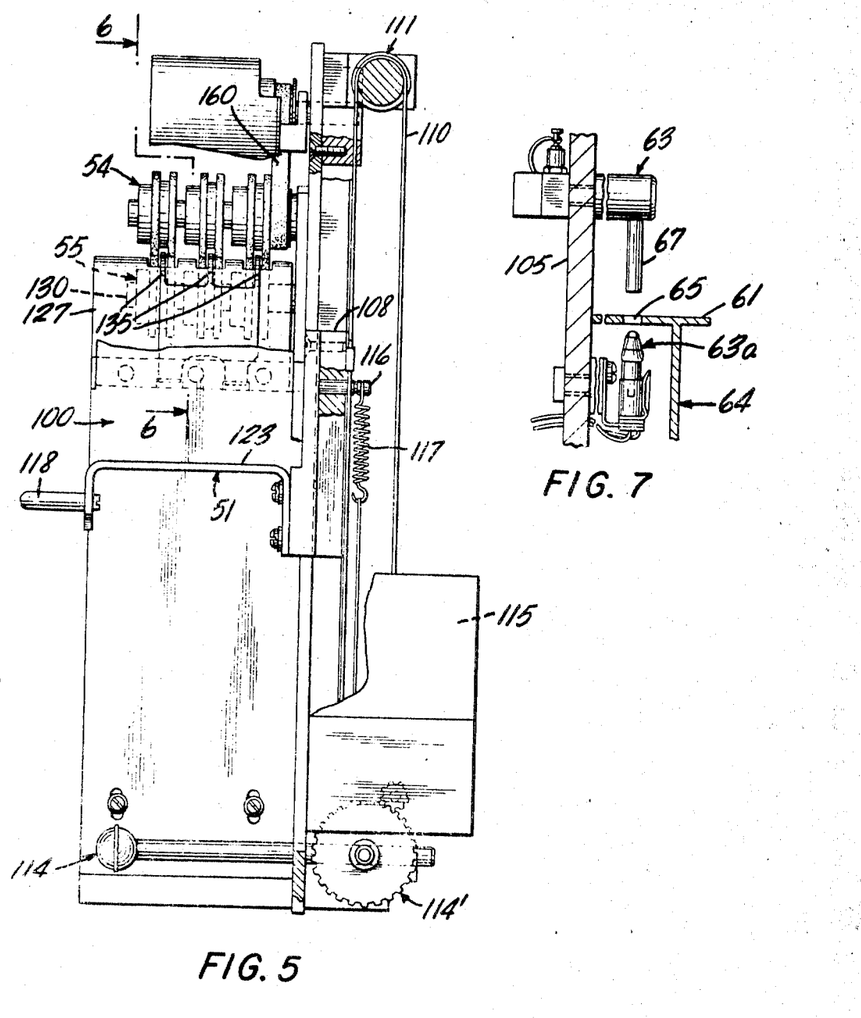
FIGURE 5 is an enlarged end elevational view of the apparatus of FIGURE 3, portions being removed.
FIGURE 7 is an enlarged side elevational view showing a photoelectric cell and the source of light associated therewith of the apparatus of FIGURE 3.

The extractor rollers 53, which have document-engaging surfaces composed of a suitable rubber, for example, drive at least one document between the separator rollers 54 and the retard rollers 55 with the aid of a pair of guides 126 and 127. As shown in FIG. 5, each group of rollers 54 and 55 is mutually spaced apart and coaxial, and each individual roller 54 is aligned with a corresponding individual roller 55. The durometer of the rollers 55 preferably exceeds the dorometer of the rollers 54 and the axes of rotation of these rollers are mutually spaced such a distance that the document engaging surfaces of the rollers 54 and 55 are so spatially related as to insure that a document fed therebetween is securely gripped thereby. The shaft 130 on which the retard rollers 55 are mounted may be adjusted in the vertical direction by an adjustment knob 131 (FIG. 4) through any suitable drive mechanism 132 known to the art so that the spacing between the rollers 54 and 55 may be adjusted to accommodate documents of different thickness and to correct for wear of their document-engaging surfaces. As an alternative embodiment, the durometers of the rollers 54 and 55 are the same but the coefficient of friction of the rollers 54 exceeds that of the rollers 55. In accordance with still another embodiment of the invention, the rollers 55 may be axially displaced from and extend between the rollers 54.

Disposed between adjacent separator rollers 54 is a plurality of spring-biased fingers 135 which urge documents fed by the extractor 52 into contact with the rollers 54 along a line substantially parallel with a line in the zone of contact between the rollers 54 and 55 perpendicular to the line of travel of a document therebetween. The fingers 135 also retain the documents against the document-engaging surfaces of the rollers 54 until the documents reach the zone of contact. In this way the documents are prevented from first striking the retard rollers 55 and being driven back toward the stack 50.

The fingers 135 exert an upward pressure against a document, thus insuring a driving force on the document by the roller 54 which exceeds the retarding force by the roller 55. In addition, this upward force compresses the roller 54 allowing the easier passage of thick documents which may greatly exceed the gap between the rollers 54 and 55. For example, it has been noted in testing, that even when separation is accomplished between successive documents of only .002″ thickness, documents that are .015″ thick may pass through the rollers 54 and 55. This separation capability is extremely important in a document feeder, in order that two documents do not enter the machine one on top of the other and remain undetected in that condition, causing inconvenience in an operation where each document must be accounted for. Furthermore, this highly significant separation capability has even been demonstrated in separating documents which have been stuck together by folding over the common corners of two documents or when two documents have been glued together with a light adhesion cement over a small area.

Disposed downstream of the rollers 54 and 55 and on opposite sides of the path of travel 140 of a document from the feeder section 45 to the reading section 47 are the pullout rollers 56 and 57, the rollers 56 having a suitable document-engaging surface of rubber, for example, and the metal idler rollers 57 being spring-biased against the rollers 56.

The rollers 53, 54, 55 and 56 are all driven by a suitable drive motor 141 (FIG. 4) which is energized through appropriate conventional circuitry (not shown) by a switch in the control panel 87. The drive motor 141 is coupled (FIGS. 2 and 4) through a belt 142, a pulley 143, a shaft 144, gears 145 and 146, a shaft 147, a pulley 148, a belt 149, a feed clutch means 149a, and gears 150 and 151 to a gear 152. The clutch means 149a may be of any suitable conventional type which can be actuated by a feed control switch in the control panel 87 for selectively decoupling the gear train driven by the gear 150. The gear 152 drives the separator rollers 54 through a gear 153 and shaft 152, and the retard rollers 55 through the gears 155, 156, 157 and the shaft 130. The gear 156 also drives the pullout rollers 56 through the shaft 159. The extractor rollers 53 are driven through a belt 160 (FIGS. 5 and 6) mounted on the shaft 154 and another belt (not shown) within the housing of the extractor 52. The extractor 52 may be rotated by means of a handle 161 about a shaft 162 on which it is mounted to rest on a rubber post 163 to facilitate access to the document-receiving enclosure 100, if desired.

REGISTRATION SECTION

Figures 3, 6:
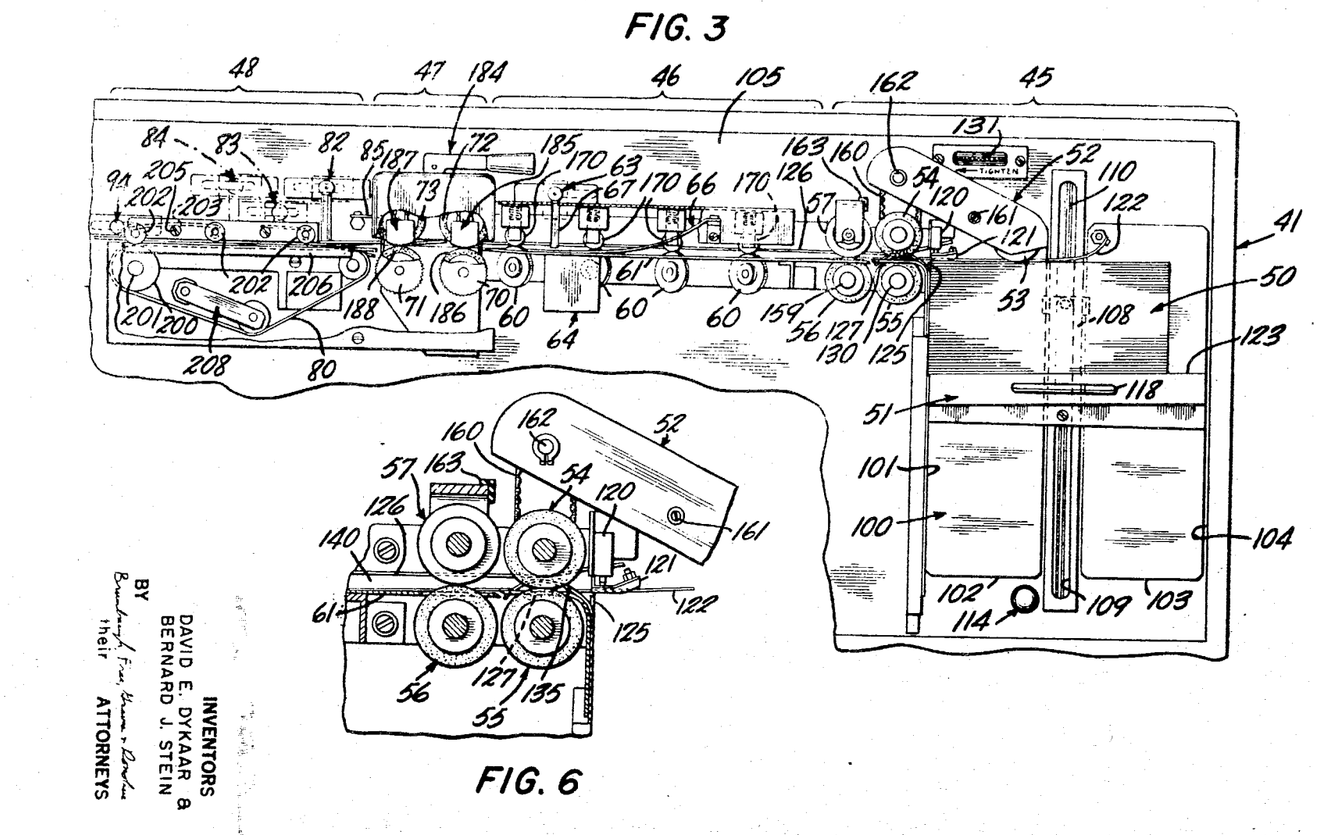
FIGURE 3 is a view in front elevation of the apparatus of FIGURE 2.
FIGURE 6 is a view taken along the line 6—6 of FIGURE 5 and looking in the direction of the arrows.

The documents are driven through the registration section 46 (FIG. 2) between the guide 126 and the platform 61 by the registration rollers 60, the document-engaging surfaces of which are preferably composed of rubber, for example. A document is maintained in driving engagement with each roller 60 by a spring-mounted metal idler roller 170 (FIG. 3). The rollers 60 are driven from the drive motor 141 (FIG. 4) through a main drive belt 171 and registration drive belts 172, 173, 174 and 175. In order to convey a document to the registration section at a speed of 150 inches per second, the document-engaging surfaces of rollers 60 must be driven at a slightly greater speed, the ratio of the roller surface speed to 150 inches per second being equal to the secant of the acute angle (about 10° in the preferred embodiment) at which the shafts carrying the rollers 60 are disposed from a line perpendicular to the registration plate 62.

TAPE TRANSPORT SECTION

The two tapes 80 (FIG. 1) are composed of a material suitable for facilitating sliding engagement with a document when the leading edge thereof is gripped by the first drive rollers 81 in the pocket section 49. The transport tapes 80 are driven by a pulley 200 which is coupled to the main drive belt 171 through a shaft 201 (FIG. 3). Three pairs of metal idler rollers 202 (FIGS. 2 and 3) are resiliently supported by a pair of leaf springs 203 and 204 which are mounted on a pair of posts 205, the tapes 80 being supported by a platform 206. A spring-biased idler 208 insures that the proper tension is maintained in the tapes 80.

SPACING AND JAM DETECTION

Figure 8:
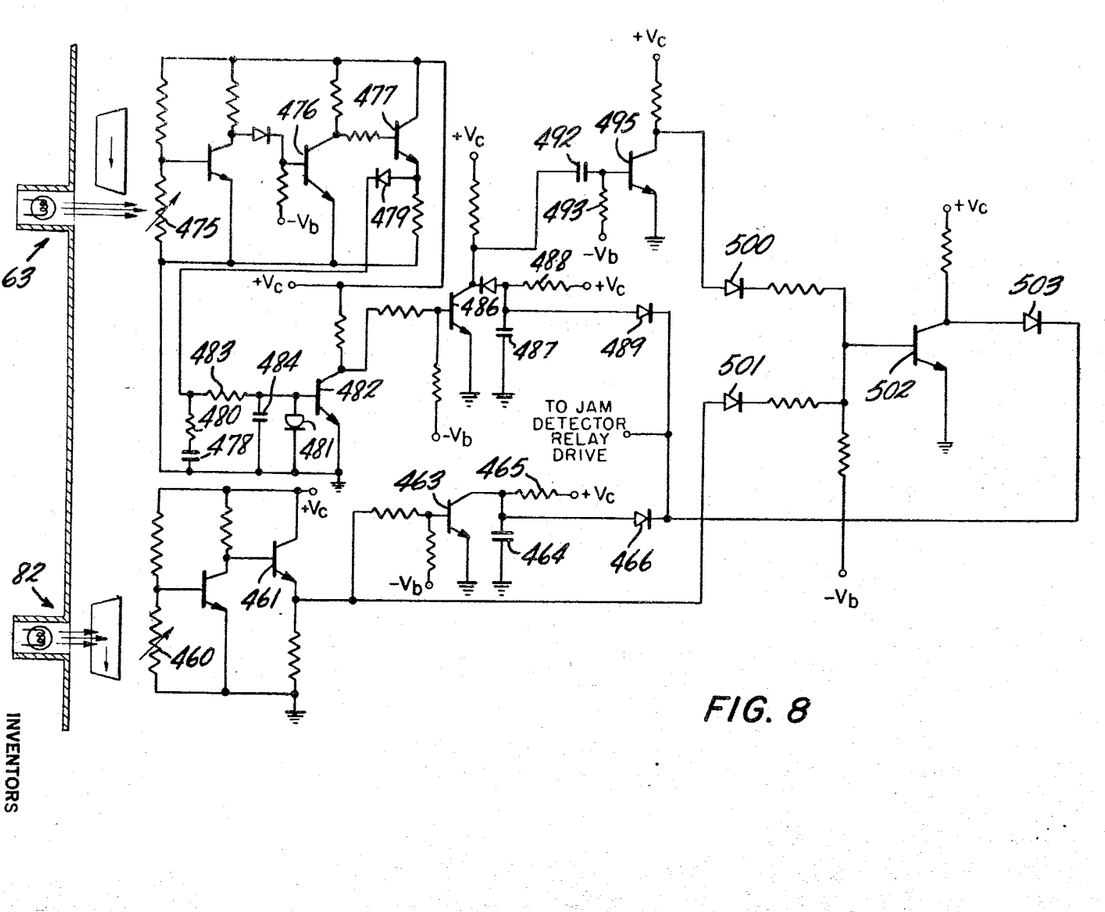
FIGURE 8 is a schematic diagram of a spacing and jam detector circuit according to the invention.

The spacing between successive checks or other documents and the speed of each check are monitored by the spacing and jam detector circuit shown in FIG. 8. When a check breaks the light beam of the sensor 82, the associated photoconductive device 460, which preferably has a rapid response time and may be a germanium photodiode, for example, causes the voltage at the emitter of a transistor 461 to drop, thereby cutting off a transistor 463 which normally bypasses a capacitor 464, whereupon the capacitor 464 is charged through a resistor 465 by a suitable source of direct current. The values of the resistor 465 and the capacitor 464 are so chosen that a jam detector relay drive circuit will be energized through a diode 466 if the capacitor 464 is not bypassed again within a certain predetermined time, this time being a measure of the minimum speed of a document past the sensor 82 which may be determined from the length of that check.

When the next successive check crosses the light beam of the sensor 63, the associated photodiode 475 will cut-off a transistor 476, so that an emitter follower circuit including a transistor 477 charges a capacitor 478 through a diode 479 and a resistor 480 and turns on a tunnel diode 481 which fires a transistor 482 very quickly, the values of the capacitor 478 and the resistor 480 being selected so that the capacitor 478 is rapidly charged. If there should be a hole in the check crossing the light beam of the sensor 63, the transistor 476 will be turned on and off, but the operation of the spacing and jam detector circuit will not be disturbed because the capacitor 478 keeps the tunnel diode 481 and the transistor 482 energized for a relatively long time. This long time period is determined by the values of the capacitor 478, the resistor 480 and a resistor 483, the diode 479 preventing the discharge of the capacitor 478 through the emitter follower circuit including the transistor 477. A capacitor 484 connected across the tunnel diode 481 serves as a noise filter to prevent the tunnel diode 481 from being inadvertently triggered.

Energization of the transistor 482 cuts off a transistor 486 which normally bypasses a capacitor 487. This capacitor 487 is then charged through a resistor 488 and will trigger the jam relay drive circuit through a diode 489 if the speed of the second check does not exceed the predetermined minimum value. The positive pulse at the collector of the transistor 486 is differentiated by a capacitor 492 and a resistor 493, the differentiated signal energizing a transistor 495. The negative pulses from the collector of the transistor 495 are applied to a diode 500 which comprises an AND circuit in conjunction with a diode 501. The potential of the emitter of the transistor 461 is relatively high when no check breaks the beam of the sensor 82, but as long as a check is beneath the sensor 82 the emitter of the transistor 461 is at ground potential.

Thus if the first check is beneath the sensor 82 when the leading edge of the second check breaks the light beam of the sensor 63, the inputs to both diodes 500 and 501 will be low and a transistor 502 will be cut-off thereby transmitting a positive pulse through a diode 503 to the jam relay drive circuit. It is necessary to provide a differentiated signal to the diode 500 in order to represent the leading edge of the second check, so that the jam detection circuitry will be operated if checks are being sorted having a length greater than the distance between the sensors 63 and 82. The sensors 63 and 82 may be mutually spaced by seven and three-quarter inches, for example, so that if successive checks are spaced less than seven and three-quarter inches, indicating an excessive feed rate, the jam detector relay drive will be triggered.

Thus, the sensors 63 and 82 provide two types of jam protection, namely monitoring of the spacing between successive checks as well as the minimum speed of each check.

The jam detector relay drive circuit is a conventional pulse generator which provides an output pulse of sufficient magnitude and duration to energize a relay (not shown) which causes the drive motor 141 and the synchronous motor 180 to stop. Conventional electrical braking is employed to stop these motors, simultaneously disconnecting the energizing circuitry therefor and grounding the field coils through an appropriate capacitor.

We claim:

1. Apparatus for feeding a single document from a plurality of documents arranged in a stack, comprising means for extracting at least one document from the stack of documents, first roller means, second roller means in cooperative relation to said first roller means, said first and second roller means having document-engaging surfaces, said extracting means being adapted to feed at least one document between said first and second roller means, means for rotating said first roller means in a direction for driving a document fed by said extracting means between said first and second roller means and for rotating said second roller means in a direction tending to prevent a document fed by said extracting means from passing between said first and second roller means, means for conveying the documents from said first and second roller means along a path, first photoelectric means along the path for detecting the presence of a document, second photoelectric means along the path in spaced relation to said first photoelectric means for detecting the presence of a document, means responsive to the relative detection of the documents by said first and second photoelectric means for determining whether the spacing between successive documents is less than a predetermined minimum value, and means responsive to said minimum spacing determining means for disabling said feeding means and said conveying means, said minimum spacing determining means including first means responsive to said first photoelectric means for generating a pulse the duration of which equals the time a document is in operative relation to said first photoelectric means, second means responsive to said second photoelectric means for generating a pulse the duration of which equals the time a document is in operative relation to said second photoelectric means, and means responsive to said first and second pulse generating means for generating a signal the duration of which coincides with the period during which the pulses from said first and second pulse generating means are mutually coincident.

2. Apparatus as claimed in claim 1, including means for differentiating the pulse generated by said first pulse generating means, the documents traveling in a direction from said first photoelectric means to said second photoelectric means.

3. Apparatus for feeding a single document from a plurality of documents arranged in a stack comprising means for extracting at least one document from a stack of documents, first roller means, second roller means in cooperative relation to said first roller means, said first and second roller means having document-engaging surfaces, said extracting means being adapted to feed at least one document between said first and second roller means, means for rotating said first roller means in a direction for driving a document fed by said extracting means between said first and second roller means and for rotating said second roller means in a direction tending to prevent a document fed by said extracting means from passing between said first and second roller means, said first and second roller means having mutually spaced axes of rotation spaced apart a distance such that said first and second roller means cooperatively engage documents having thicknesses within a given range at a predetermined zone of contact to insure that a document fed thereto is securely gripped thereby, and means for urging a document fed by said extracting means into contact with said document-engaging surface of said first roller means upstream of the zone of contact and for retaining the document against said document-engaging surface of said first roller means until the document reaches the zone of contact.

4. Apparatus for feeding a single document from a plurality of documents arranged in a stack, comprising means for extracting at least one document from the stack of documents, first roller means, second roller means in cooperative relation to said first roller means, said first and second roller means having document-engaging surfaces, said extracting means being adapted to feed at least one document between said first and second roller means, means for guiding a document fed by said extracting means into contact with said first roller means before the document reaches said second roller means, and means for rotating said first roller means in a direction for driving a document fed by said extracting means between said first and second roller means and for rotating said second roller means in a direction tending to prevent a document fed by said extracting means from passing between said first and second roller means.

5. Apparatus for feeding a single document from a plurality of documents arranged in a stack, comprising means for extracting at least one document from the stack of documents, first roller means, second roller means in cooperative relation to said first roller means, each of said first and second roller means having a plurality of spaced-apart, coaxial, document-engaging surfaces, said extracting means being adapted to feed at least one document between said first and second roller means, means disposed between said spaced-apart document-engaging surfaces of said first roller means for urging documents fed by said extracting means into contact with said document-engaging surfaces of said first roller means, and means for rotating said first roller means in a direction for driving a document fed by said extracting means between said first and second roller means and for rotating said second roller means in a direction tending to prevent a document fed by said extracting means for passing between said first and second roller means.

6. Apparatus as claimed in claim 5, wherein said urging means includes at least one spring-biased finger.

7. Apparatus as claimed in claim 5, wherein said document-engaging surfaces of said first roller means engage said document-engaging surfaces of said second roller means in a plurality of contact zones, and said urging means is so disposed that a document fed by said extracting means contacts said document-engaging surfaces of said first roller means along a line substantially parallel to a line which connects the plurality of contact zones and which is substantially perpendicular of the direction of travel of a document between said first and second roller means.

8. In apparatus for handling documents wherein the documents are to be conveyed along a path interposed between a first conveying section operative at a first speed to a second conveying section operative at a second speed, the second speed being les than the first speed, the combination of at least one elongated tape means disposed along the path between the first and second conveying sections and in underlying relation to the document and operative at a speed greater than the second speed for conveying a document from the first conveying section to the second conveying section, and means for urging the document into engagement with said tape means, said tape being composed of material adapted to promote sliding engagement with the document when the document is gripped by the second conveying section.

References Cited

UNITED STATES PATENTS

| | | | |
|---|---|---|---|
| 2,963,293 | 12/1960 | Klein | 271—57 |
| 3,114,902 | 12/1963 | Tanguy | 271—57 X |
| 350,974 | 10/1886 | Corkhill | 271—36 |
| 489,925 | 1/1893 | Burnet | 271—39 |
| 650,410 | 5/1900 | Morin | 271—36 |
| 770,260 | 9/1904 | Cahill | 198—76 |
| 1,193,693 | 8/1916 | Ielfield | 271—36 |
| 2,845,122 | 7/1958 | Lake | 271—58 X |
| 2,995,364 | 8/1961 | Frederick | 271—59 X |
| 3,311,224 | 3/1967 | King | 198—34 |

EDWARD A. SROKA, Primary Examiner

U.S. Cl. X.R.

250—223; 271—36, 57, 59